United States Patent

Erdy

[15] 3,691,106
[45] Sept. 12, 1972

[54] NOVEL DETERGENT COMPOSITIONS
[72] Inventor: Nicholas Z. Erdy, New York, N.Y.
[73] Assignee: Stauffer Chemical Company, New York, N.Y.
[22] Filed: Aug. 28, 1970
[21] Appl. No.: 68,015

[52] U.S. Cl. .................. 252/544, 252/89, 252/132, 252/140, 252/155, 252/523, 252/525, 252/527, 252/541, 252/546, 252/DIG. 2
[51] Int. Cl. .............................................. C11d 3/30
[58] Field of Search........252/89, 135, 527, 525, 544, 252/546, 140, 155; 260/78.5 R

[56] References Cited

UNITED STATES PATENTS

| | | |
|---|---|---|
| 2,264,103 | 11/1941 | Tucker .................. 210/23 |
| 2,311,008 | 2/1943 | Tucker .................. 210/23 |
| 3,060,124 | 10/1962 | Ginn .................... 252/135 |
| 3,060,155 | 10/1962 | Reinhard ............. 260/78.5 R |
| 3,073,805 | 1/1963 | Reinhard ............. 260/78.5 R |
| 3,073,806 | 1/1963 | Reinhard ............... 252/89 X |
| 3,208,949 | 9/1965 | Rosnati ................. 252/89 X |
| 3,308,067 | 3/1967 | Diehl .................... 252/161 |
| 3,346,873 | 10/1967 | Herrmann ............. 252/526 |

FOREIGN PATENTS OR APPLICATIONS 227,960   6/1958   Australia

Primary Examiner—Leon D. Rosdol
Assistant Examiner—Harris A. Pitlick
Attorney—Wayne C. Jaeschke, Martin Goldwasser and Daniel S. Ortiz

[57] ABSTRACT

There are disclosed novel detergent compositions comprising a mixture of one or more surfactants with a unique builder for said compositions which comprises a crosslinked, water-insoluble copolymer of at least one $C_2$–$C_3$ olefin and at least one polycarboxyl vinyl monomer; said crosslinked, water-insoluble copolymer being a water-swellable, gel-forming material.

16 Claims, No Drawings

METHOD OF TREATING PERMEABLE FORMATIONS

BACKGROUND OF THE INVENTION

It is often desirous to prevent the flow of fluids through certain zones of geologic formations, e.g., aquifers. For example, fluid producing formations encountered when drilling petroleum wells, when creating shafts, tunnels and other types of underground passageways, such as, when connecting underground passageways with the surface of the earth can cause serious problems. Also, foundations upon which large buildings or dams are being prepared usually must be impermeable to the flow of water and the like. In the past various methods have been employed in an attempt to prevent such flow from or through certain zones of such formations. For example, grouting material has been forced into natural occurring fissures and fractures in such formations to partially prevent the flow of fluids. Likewise, such formations have been hydraulically fractured to produce additional fractures which are then grouted. However, these means are not always successful because such formations do not always contain natural occuring fractures which can be grouted to prevent the flow of fluids. Likewise, a sufficient amount of hydraulic pressure cannot always be exerted on such formations to provide a sufficient number of additional fractures for effectively shutting off fluid flow. Also, since the drilling is performed in relatively dry formations (after treatment thereof by the present invention) air drilling can be employed instead of circulating drilling muds. This can constitute substantial savings in the operation.

SUMMARY OF THE INVENTION

In the present method a permeable formation is penetrated by at least one treatment borehole. A sufficient amount of a blasting agent is disposed in the borehole contiguous to the zone of the formation desired to be grouted. The explosive is detonated to provide a multiplicity of fractures extending radially away from said borehole. Rubble, if any, may then be removed from the borehole and the fractures grouted to reduce the permeability of the formation in the fractured and grouted zone. The permeable formations may be producing undesirable fluids, e.g., an aquifer, which it may be desired to reduce, and/or it may be a formation through which the flow of fluids is to be restricted, e.g., supporting formations upon which structures are to be built.

BRIEF DESCRIPTION OF THE DRAWINGS

FIGS. 1–4 illustrate one embodiment of the present invention where a fluid bearing formation is treated by the method of the present invention to prevent the flow of fluid into a large diameter shaft.

FIG. 5 illustrates the configuration of the drilling pattern for the method described in Example 2.

FIGS. 6 and 7 illustrate still another embodiment of the present invention wherein a large underground area is treated by the method of the present invention to prevent the flow of fluids through formations forming support for a structure, e.g., a dam.

FIGS. 8 and 9 illustrate another embodiment of the instant invention employing treatment holes drilled in an angled spiral configuration.

FIGS. 10 and 11 illustrate two embodiments of the present invention as applied to the treatment of a fluid bearing formation through which a substantially horizontal tunnel is to be prepared. In FIG. 10 the treatment boreholes are drilled down from the surface of the earth and the formation is fractured and grouted by the method of the present invention to provide a grouted zone through which the tunnel can be prepared. In FIG. 11 the treatment bore(s) (more than one if necessary) is drilled ahead of tunnel and the fluid bearing formation treated in a like manner. The number of treatment boreholes shown is merely illustrative, the exact number employed is dependent on the size of the formation to be treated, the type of explosive employed and other like conditions.

DETAILED DESCRIPTION OF THE INVENTION

In the practice of the present invention the permeability of a permeable geologic formation penetrated by at least one treatment borehole is reduced in the following manner. A predetermined amount of a blasting agent is disposed within the treatment borehole(s) contiguous to the permeable formation desired to be treated. The blasting agent is detonated producing multiple fractures in said formation extending radially away from the treatment borehole. In many instances intersecting, cross-connecting fractures are also produced. Rubble, if any, is then preferably removed from the borehole and the fractures, and, if desired, the so produced cavity is grouted to prevent the flow of fluid through the fractured zone.

The present invention can be employed to prepare openings, e.g., shafts, boreholes, tunnels, etc., which have a relatively large diameter, e.g., a few feet or more. Because of the large diameter it may be impractical to attempt to fracture permeable formations penetrated by such openings with a blasting agent. In the present method, therefore, at least one smaller treatment borehole is first drilled and the permeable formation treated, i.e., fractured and grouted, employing the treatment borehole as the base of operation.

With reference to FIGS. 1–4 one embodiment of the present invention is practiced as follows. It is desired to sink an opening, e.g., shaft, borehole, etc., having a final diameter 10, for example to connect with an underground passageway 17. At least one smaller treatment borehole 11 is first provided, e.g., drilled, approximately concentric and along the vertical axis of the desired hole 10. When the smaller treatment borehole 11 penetrates a fluid producing formation 12, FIG. 2, e.g., an aquifer, drilling is temporarily stopped. A predetermined amount of a blasting agent 13 is disposed in the treatment borehole 11 contiguous, i.e., adjacent, to the fluid producing formation 12. As will be more fully discussed hereinafter a sufficient amount of a particular blasting agent is provided so that upon the detonation thereof fractures will be produced in the fluid bearing formation 12 extending a known distance from and around the treatment borehole 11. In this embodiment the fractures should extend a distance greater than the diameter of the final hole 10. The blasting agent 13 is then detonated to produce the fractures 14, FIG. 3, extending radially away from the treatment borehole 11 and a distance greater than the diameter of the final hole 10, FIG. 3. The fractures are then grouted with a suitable material 15 in a manner should have a molecular weight prior to crosslinking, as expressed in terms of their relative viscosity as determined, at 25° C., with a 1 percent solution of the copolymer in N-methylpyrrolidone, of at least about 1.05. Thus, the use of copolymers having a substantially lower molecular weight is undesirable inasmuch as large quantities of crosslinking agent will be required in order to convert them into their required water-insoluble albeit water-swellable, gel forming form. Those skilled in the polymer art will have little or no difficulty in adjusting the process variables of the polymerization reaction in order to be able to prepare the resulting copolymers so that their molecular weights are greater than the above stated minimum limit.

Since the polymeric detergent builders of this invention are most conveniently utilized in the form of their salts, such salts, including their alkali metal and ammonium salts, may be readily prepared either prior or subsequent to the crosslinking of these copolymers. Thus, it is merely necessary to react the solid copolymer at ambient temperatures with about a 10 percent, by weight, aqueous solution of sodium, potassium, lithium, or ammonium hydroxide for a sufficient period until a swollen structure is obtained. The latter product is then added to an alcohol in order to precipitate out the desired copolymer salt.

As has previously been noted, the polymeric detergent builders of this invention must be in a water-insoluble, gel-forming crosslinked form. Thus, crosslinking of these copolymers is usually carried out as a distinct and separate step which is conducted subsequent to their polymerization.

More particularly, the post-polymerization, crosslinking of these copolymers, or their salts, involves their reaction with an effective concentration of one or more reagents capable of transforming their essentially linear configuration into a three-dimensional, water-insoluble network. Preferred for this purpose are the compounds having the structure:

wherein R represents an aliphatic or aromatic hydrocarbon group having from about two to 30 carbon atoms and which may contain one or more hetero atoms such, for example, as an oxygen, sulfur or nitrogen atom; X represents a primary or secondary - OH group; an isocyanate, i.e., —N = C = O, group, an epoxy group; an ethyleneimine a primary or secondary —SH, —NHR' group wherein R' represents hydrogen, an alkyl or a substituted alkyl group having from 1 to 12 carbon atoms which may be linear or branched and wherein suitable substituent groups for said alkyl groups may comprise halo, nitro, alkoxy, cyano, acyl and the like and n represents an integer having a value of from about 2 to 100.

Exemplary of the applicable crosslinking agents conforming to the above formula are: glycols such as ethylene glycol, the propane glycols, the butane glycols, the pentane glycols, the hexane glycols, the cyclohexane glycols, the heptane glycols, the octane glycols, the nonane glycols, the decane glycols, the undecane glycols, the dodecane glycols and the xylene glycols; the triols such as glycerol, trimethylol-propane, the butane triols, the pentane triols, the hexane triols, the cyclohexane triols, the heptane triols, the octane triols, the nonane triols, the decane triols, the undecane triols, the dodecane triols, the tetrols such as the butane tetrols, the pentane tetrols including pentaerythritol, the hexane tetrols, the cyclohexane tetrols, the heptane tetrols, the octane tetrols, the nonane tetrols, the decane tetrols and, the undecane tetrols; the pentitols such as arabitol, adonitol, xylitol and rhamnitol; the hexitols such as glucose, mannitol, sorbitol and dulcitol; and, the heptitols such as pereseitol and volemitol.

Also applicable are the higher polyhydric alcohols of the saccharide types such as raffinose, sucrose, galactose, mannose, gulose, idose, tolose, allose, fructose, sorbose, and the acetylenic and olefinic unsaturated glycols such as 2-butyne-1,4-diol, 3,6-dihydroxy-cyclohexene and dipropenylglycol; polyhydric amines such as ethylene diamine, trimethylene diamine, tetramethylene diamine, pentamethylene diamine and hexamethylene diamine; the cyclohexane diamines, heptamethylene diamine, octamethylene diamine, nonamethylene diamine, decamethylene diamine, o-phenylene diamine, m-phenylene diamine, p-phenylene diamine, diethylene triamine, triethylene tetraamine, ethanolamine, tetraethylene pentamine, pentaethylene hexamine, polyethyleneimine, the N,N'dialkyl or diaryl ethylene diamines where the alkyl or the aryl groups have a combined value of from two to 12 carbon atoms and nitrilo bis-propylamine polyhydric thioglycols such as ethylene dithioglycol, propylene dithioglycol, trimethylene dithioglycol, tetramethylene dithioglycol, pentamethylene dithioglycol and the like; polyhydric amino alcohols such as diethanolamine, 2,3-dihydroxypropyl amine, N-alkyl or N-aryl ethanolamines wherein the alkyl group has from one to 12 carbon atoms; thio amines such as beta-mercapto ethyl amine, beta-mercapto-N-alkyl or N-aryl ethyl amines wherein diisocyanates such as tolylene diisocyanate, hexamethylene diisocyanate, methylene, bis-(p-phenyl isocyanate) and the like; and, unsaturated organic alcohols such as allyl alcohol and 1-dodecene-10-ol, and the like. In addition, certain hydroxyl containing polymeric materials, such as polyvinyl alcohol, may also be used as crosslinking agents.

From the above listed group of crosslinking agents, it is preferred to employ (1) alkylene polyamines such, for example as diethylene triamine, triethylene triamine, triethylene tetramine and tetraethylene pentamine; or (2) alpha, omega-polymethylene diamines such, for example, as ethylene diamine, hexamethylene diamine, octamethylene diamine and o-phenylene diamine. The actual crosslinking reaction may be conducted by admixing a solution of the copolymer, which may be in its anhydride, acid or salt form or as a copolymer salt mixture thereof, with a solution containing an effective concentration of the selected crosslinking agent and thereupon heating the resulting mixture, with agitation, at a temperature of from about 25° to 100° C. and for a period of from about 5 minutes to 24 hours. The precise details of time, temperature and concentration of crosslinking agent will, of course, be dependent upon such factors as the particular copolymer and crosslinking agent which are being reacted. However, in most instances the weight ratio of the copolymer to the crosslinking agent will range from about 20:1 to about 500:1.

Regardless of the manner in which the crosslinking of the copolymer is achieved, it is essential that the crosslinking reaction should proceed to a degree which is sufficient to result in the preparation of an essentially water-insoluble rather than a water soluble material. Accordingly, the crosslinking reaction should yield a product characterized by its ability to form a three-dimensional, water-insoluble, gel-network when introduced into an aqueous medium wherein it will appear as a translucent or transparent suspension which may or may not be in the colloidal form. This three-dimensional gel network is highly swellable under the alkaline conditions encountered when it is used as part of a detergent composition but it does not, however, go into solution since its gel-network remains insoluble. Thus, it is to be stressed at this point, that the novel detergent builders of this invention must be both crosslinked and yield water-insoluble gel structures in an aqueous medium. As will be seen, it is this unique combination of properties which serves to distinguish these novel builders from the polymeric detergent builders of the prior art which, as has been noted, were in all cases water soluble regardless of whether they were in linear or crosslinked form. It may also be noted that while such crosslinked, water-insoluble, gel-forming copolymers of olefins and polycarboxyl vinyl monomers have been known to those skilled in the art and are, in fact, commercially available, they have never, heretofore, been suggested for use as builders for detergent compositions.

As opposed to species forming liquids on dissolution, the swollen or partially swollen crosslinked polymer gels produced upon the admixture with water of the polymer builders of this invention, may technically be described as solids since they can support their own weight and have a certain degree of rigidity after the dispersed particles are coalesced as, for example, by centrifugation, or if there is a sufficient concentration present to pervade the entire available liquid. As is true of other gels, the detergent builders of this invention may be rheologically characterized by the absence of steady flow upon being subjected to slight stresses. Such behavior in binary systems, even where a very high content of a liquid solvent is present, is accounted for by the presence in a gel of a three-dimensional network formed by the solute which thus serves to hold the liquid solvent entrapped therein.

While detergent builders comprising essentially water-soluble, linear polymers or essentially water soluble polymers containing branches formed by means of partial crosslinking, or other means, may provide results equivalent to inorganic phosphates such as sodium tripolyphosphate, the novel crosslinked, water-insoluble detergent builders of this invention will, on the other hand, generally provide results which are significantly better than those attainable with the inorganic phosphates. These superior results have been found to be directly attributable to the water-insoluble, three dimensional gel structure which they provide upon introduction into an aqueous medium.

In some cases, the gel structure of the detergent builders of this invention, when dispersed in an aqueous medium, will pervade 100 percent of the liquid volume whereas in other cases it will pervade only part of it. This factor, known as the gel volume percent, provides a convenient means for further characterizing these novel detergent builders. Thus, the gel volume percent of these builders may vary as a result of the influence of such factors as the individual swelling characteristics of the particular crosslinked copolymer or the absolute amount of gel that is present. Moreover, there is a definite and highly significant correlation between the gel volume percent of these builders and their efficiency as detergent builders. This relates to the fact that the efficiency of these polymeric detergent builders is proportional to the amount of gel which they yield in an aqueous medium, i.e., the gel volume percent of these polymeric builders is related to their detergency or cleaning power.

In determining gel volume percent, the following procedure is used:

Test No. 1

A 1 percent, by weight, aqueous suspension of the detergent builder is prepared by mixing one gram of the solid detergent builder and 99 grams of distilled water which has been preheated to about 60° C. In some cases, as when the crosslinked polymeric detergent builder is in its anhydride form, the anhydride linkages must be hydrolyzed prior to determining the gel volume percent and this may be accomplished by warming the anhydride copolymer, with agitation, in an alkaline, aqueous medium having a pH of about 11 until full swelling is attained. In general, the process takes from 2 to 24 hours and during this period care must be exercised in order to prevent loss of water through evaporation.

The pH of the resulting suspension is then adjusted to a level of about 11±0.5 with a 20 percent, by weight, solution of sodium hydroxide whereupon it is cooled to room temperature, homogenized by agitation and poured into a 50 milliliter graduated centrifuge tube. The fluid is centrifuged at 2,500 rpm in a centifuge in which the horizontal distance between the end of the centifuge tube and its rotating center axis is no more than 19 centimeters. After 30 minutes, the line of demarcation separating the gel and the soluble phases is read and the gel-volume percent is calculated according to the following formula:

$$\text{Gel volume percent} = \frac{\text{Volume of gel}}{\text{Total volume of aqueous mixture}} \times 100$$

A gel volume of at least 5 volume-percent indicates that a crosslinked, water-insoluble, but water-swellable copolymer gel is present. However, the best crosslinked copolymers for use as detergent builders in the compositions of this invention are those which have a gel volume greater than 50 volume-percent with an optimum gel volume of 100 percent; all of these gel volumes being determined at a pH of about 11.

In those cases where there is no visible line of demarcation separating the gel and soluble phases, whether this is due to the presence of 100 percent gel volume or to the complete absence of any gel, a second test must be performed on the same aqueous system in order to determine the gel volume percent of the polymeric builder dispersed therein.

Test No. 2

Under agitation, the same gel suspension, while still in the same graduated centrifuge tube as used in Test No. 1, is acidified by the dropwise addition of an approximately 37 percent, by weight, aqueous solution of HCl. Acidification and agitation are continued until the first sign of permanent turbidity is observed thereby signalling incipient coagulation. Additional HCl solution is then added dropwise with agitation being applied after adding each drop so as to reach coagulation of the gel. The recognition of the onset of coagulation may be facilitated by the observation of the air bubbles formed during the mixing of the gel suspension which is accomplished by shaking. Small bubbles do not rise in the gelled medium, they rise only after the onset of the coagulation. The commencement of the rising of the bubbles is, therefore, the endpoint of the test, at which time centrifugation may now be begun. It is to be noted, that the addition of HCl should not exceed the endpoint because the gel volume percent decreases as the pH is lowered. The centrifugation is then repeated at 2,500 rpm for 30 minutes as described above in Test No. 1. The gel volume within the tube and the pH of the supernatant are then recorded and the gel volume percent of the total solution is calculated by means of the formula set forth, in Test 1.

In the event that the addition, in Test No. 2, of the HCl solution to the gel suspension does not produce any permanent turbidity, it may be concluded that the sample is not a crosslinked material or, if crosslinked, that it is water soluble and is, therefore, unsuitable for use as a detergent builder in the compositions of the present invention. Moreover, as has been noted, only those crosslinked water insoluble polymeric builders capable of exhibiting a gel volume of at least about 5 and, preferably, at least about 50 percent, as determined by Test No. 1 or Test No. 2 are suitable for use in the detergent compositions of this invention. Optimum results are, however, obtained by the use of detergent builders having a gel volume of 100 percent, as determined by Test No. 1.

In using the above described builders to prepare detergent compositions, it is merely necessary to intimately admix one or more of these builders with one or more surfactants, i.e., surface active agents. The selected surfactant may be an anionic, nonionic, zwitterionic or an ampholytic, i.e., amphoteric, surfactant or one may employ a mixture of any two or more surfactants which may be of the same or of two or more different types, e.g., a blend of an anionic and nonionic surfactant.

Anionic surface active compounds can be broadly described as compounds which contain hydrophilic and lipophilic groups with the hydrophilic group containing at least one negatively charged moiety. These compounds include sulfated or sulfonated alkyl, aryl and alkyl aryl hydrocarbons and alkali metal and ammonium salts thereof, for example, sodium salts of long chain alkyl sulfates, sodium salts of alkyl naphthalene sulfonic acids, sodium salts of sulfonated abietenes, sodium salts of alkyl benzene sulfonic acids particularly those in which the alkyl group contains from eight to 24 carbon atoms; sodium salts of sulfonated mineral oils and sodium salts of sulfo-succinic acid esters such as sodium dioctyl sulfo-succinate.

Advantageous anionic surfactants include the higher alkyl aryl sulfonic acids and their alkali metal, ammonium and alkaline earth metal salts such as for example sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium di-isopropyl naphthalene disulfonate and the like as well as the alkali metal salt of alkyl aryl (sulfothioic acid) ethers and the alkyl thiosulfuric acid, etc. Preferred anionic organic surface active agents are, as noted hereinbefore, sodium salts of alkyl benzene sulfonic acids and particularly preferred sodium salts of alkyl benzene sulfonic acids are those in which the alkyl group or radical contains 10 to 18 carbon atoms in a straight (i.e., unbranched) chain.

Nonionic surface active compounds can be broadly described as compounds which do not ionize but usually acquire hydrophilic characteristics from an oxygenated side chain, such as polyoxyethylene, while the lipophilic part of the molecule may come from fatty acids, phenols, alcohols, amides or amines. Examples of nonionic surfactants include products formed by condensing one or more alkylene oxides of two to four carbon atoms, such as ethylene oxide or propylene oxide, preferably ethylene oxide alone or with other alkylene oxides, with a relatively hydrophobic or lipophilic compound such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc.

Still other nonionic surface active compounds include the amine oxides and phosphine oxides and preferably the unsymmetrical trialkyl amine oxides and phosphine oxides wherein two of the alkyl groups are lower alkyl groups (one to four carbon atoms) and the other alkyl group is a higher alkyl group (eight to 18 carbon atoms). Examples include dimethyldodecylamine oxide, dimethyl dodecylphosphine oxide, dimethyl tetradecyl amine oxide, dimethyltetradecyl phosphine oxide, diethylhexadecylamine oxide, diethylhexadecylphosphine oxide and the like.

Particularly advantageous nonionic surface active agents are condensation products of a hydrophobic compound having at least one active hydrogen atom and a lower alkylene oxide (for example the condensation product of an aliphatic alcohol containing from about eight to about 18 carbon atoms) and from about 3 to about 30 moles of ethylene oxide per mol of the alcohol, or the condensation product of an alkyl phenol containing from about eight to about 18 carbon atoms in the alkyl group and from about three to about 30 mols of ethylene oxide per mol of alkyl phenol. Other advantageous nonionic detergents include condensation products of ethylene oxide with a hydrophobic compound formed by condensing propylene oxide with propylene glycol.

Amphoteric or ampholytic surface active compounds can be broadly described as compounds which have both anionic and cationic groups in the same molecule. Such compounds may be grouped into classes corresponding to the nature of the anionic-forming group, which is usually carboxy, sulfo or sulfato. Examples of such compounds include sodium N-coco beta amino propionate, sodium N-tallow beta amino dipropionate, sodium N-lauryl beta iminodipropionate and the like.

Zwitterionic surfactants can be broadly described as derivatives of aliphatic quarternary ammonium compounds in which the aliphatic radical may be straight chain or branched and wherein one of the aliphatic substituents contains from about eight to 18 carbon atoms and one contains an anionic water solubilizing group. Examples of compounds falling within this definition are 3-(N,N-dimethyl-N-hexadecylammonio) propane-1-sulfonate and 3-(N,N-dimethyl-N-hexadecylammonio)-2-hydroxypropane-1-sulfonate which are especially preferred for their excellent cool water detergency characteristics.

Additional representatives of compounds exemplary of each of the above described types of surfactants are given on Pages 33–269 of "McCutcheon's Detergents and Emulsifiers, 1969 Annual" published in 1969 by John W. McCutcheon, Inc., Morristown, New Jersey which is here incorporated by reference.

With respect to proportions, the concentration of the builders of this invention which is required to be blended with one or more surfactants in order to prepare an operable detergent composition will vary depending upon such factors as the end use, type of surfactants utilized, pH conditions and the like. Thus, these novel builders can be employed in detergent compositions in any desired proportions which are effective, i.e., any concentration which enhances the detergency characteristics of the selected surfactants. In general, however, the ratio of builder to surfactant will vary from about 1:10 to about 10:1 with optimum results being obtained with a ratio of builder to surfactants of from about 1:2 to about 5:1; the latter proportions being designed for the use of the resulting detergent compositions at a pH of from about 9 to 12 and preferably at from about 9.5 to 11.5.

The detergent compositions of this invention may be prepared in any of the commercially desirable forms including in the bar, granular, flake, liquid and tablet forms.

If desired, the novel polymeric detergent builders of this invention may be advantageously combined with other detergent builders which will function as supplementary builders. Such supplementary builders include the conventional alkali metal polyphosphates, i.e., the tripolyphosphates and pyrophosphates such as sodium tripolyphosphate, tetrasodium pyrophosphate, tetrapotassium phosphate, disodium pyrophosphate and the like; the amino polycarboxylic acids and salts such as the sodium, potassium and ammonium salts of nitrilotriacetic acid, the sodium, potassium and ammonium salts of amino tri(methylenephosphonic acid), as well as the free acid; and, the diphosphonic acids and salts such as methylene diphosphonic acid and 1-hydroxy, ethylidene diphosphonic acid. In addition, the detergent compositions of this invention may also contain various optional adjuncts such as foam boosters, dedusting agents, soil anti-redeposition agents, anticorrosion agents, anti-tarnishing agents, perfumes, germidical agents and optical brighteners.

In actual use, it is suggested that the detergent compositions of this invention be dispersed in water so that the resulting aqueous dispersion will contain an effective concentration of the novel crosslinked, water insoluble, gel-forming copolymer builder in the range of from about 0.07 to 7.0 percent, by weight. For best results, the water should be at a temperature in the range of from about 20° to 95° C.

The following examples will further illustrate the embodiment of this invention. In these examples all parts given are by weight unless otherwise noted.

EXAMPLE I

This example provides a comparison between a number of the crosslinked, water-insoluble, gel-forming detergent builders of this invention and: (1) a polyphosphate detergent builder, i.e., sodium tripolyphosphate (STPP) and (2) an uncrosslinked, i.e., a linear, water soluble ethylene:maleic anhydride copolymer.

The various builders are compared with respect to the gel volume percent, as determined by means of the above described procedure, as well as with respect to their actual cleaning efficiency as expressed in terms of the results obtained in the change in whiteness, i.e., the $(\Delta W)$, test. This washing test is conducted by comparing the whiteness of a standard 5 × 5 inches soiled cloth, sold by the American Conditioning House as ACH–115A, both before and after being washed with the particular detergent composition which is being evaluated. In order to provide uniform conditions the cloths are washed with a standard detergent formulation, as described below, in a standard washer, such as the Tergetometer sold by the United States Testing Co., Inc. at an initial pH of about 10.5, a rate of agitation of 145 rpm and a temperature of 120° C. for a period of 15 minutes. A 5 minute rinse cycle, at ambient temperature, is provided for the cloths whereupon they are squeezed water free, air dried and ironed. The reflectance or whiteness of the cloth samples is measured, both before and after the washing procedure, on a color difference meter such as a "D-25 Hunter Color Difference Meter," sold by Hunter Associates Laboratory, Inc. Thus, the efficacy of the detergent builder is correlated to the absolute value of the change in whiteness or $(\Delta W)$ which is calculated as follows:

$$(\Delta W) = W_A - W_B$$

where $W_A$ is the whiteness value, or reflectance, after washing and $W_B$ is the whiteness value before washing. Thus, a higher value for $(\Delta W)$ is indicative of a more efficient builder. In general, $(\Delta W)$ values are reproducible within ±2 units.

The standard detergent composition used in the above described test contains the following ingredients:

| | Parts |
|---|---|
| "Orvus AB" [1] (Anionic surfactant) | 45.0 |
| $Na_2SO_4$ (ionic strength control & filler) | 8.5 |
| $Na_2SiO_3$ (corrosion inhibitor) | 5.0 |
| $Na_5P_3O_{10}$ (threshold agent) | 0.8 |
| Carboxymethyl cellulose (soil antiredeposition agent) | 0.7 |
| Detergent builder | 40.0 |

(1) A mixture containing 43%, by weight, Na₂SO₄; 15%, by weight, NaCl; 1%, by weight, water, and, 40%, by weight, of sodium dodecylbenzenesulfonate.

In this washing test, the concentration of the above described detergent composition is at 2.5 g. per liter of water containing 175 ppm of hardness as CaCO₃.

The detergent builders which are evaluated in this manner are described in Table I, hereinbelow.

TABLE I

| Builder No. | Composition |
|---|---|
| Control | No detergent builder present |
| 1 | STPP |
| 2 | A water soluble, uncrosslinked, i.e. linear, ~1:1, by mole, ethylene:maleic anhydride copolymer having a viscosity of 7.0 cps when determined with a 2% aqueous solution as sold by the Monsanto Company as "EMA-31". |
| 3 | The water-insoluble, mixture of mono- and disodium salts of a ~1:1, by mole, ethylene:maleic acid copolymer prepared by crosslinking "EMA-31" with 20%, by wt., of diethylene triamine (DETA) and then hydrolyzing the crosslinked copolymer with 10%, by wt., of NaOH. |
| 4 | The water-insoluble mixture of mono- and disodium salts of a ~1:1, by mole, ethylene:maleic acid copolymer prepared by crosslinking "EMA-31" with 0.8%, by wt., of DETA and then hydrolyzing the crosslinked copolymer with 10%, by wt., of NaOH. |
| 5 | The water-insoluble mixture of mono- and disodium salts of a ~1:1, by mole, ethylene:maleic acid copolymer having a viscosity of 640 cps when determined with a 2% aqueous solution as sold by Monsanto Company as "EMA-54." |
| 6 | A water-insoluble, crosslinked ~1:1, by mole, ethylene:maleic anhydride copolymer sold by the Monsanto Company as "EMA-61" and having a viscosity of 100 cps when determined with a 2% aqueous solution. |
| 7 | A water insoluble, crosslinked ~1:1, by mole ethylene:maleic anhydride copolymer sold by the Monsanto Company as "EMA-71" and having a viscosity of 960 cps when determined with a 2% aqueous solution. |
| 8 | A water insoluble, crosslinked ~1:1, by mole, ethylene:maleic anhydride copolymer sold by the Monsanto Company as "EMA 81" and having a viscosity of 1,100 when determined with a 2% aqueous solution. |
| 9 | A water insoluble, crosslinked ~1:1, by mole, ethylene:maleic anhydride copolymer sold by the Monsanto Company as "EMA 91" and having a viscosity of 8,500 when determined with a 2% aqueous solution. |

Table II, hereinbelow, provides the results of the change in whiteness test ($\Delta W$) for the standard detergent compositions containing each of the above described builders as well as for a control composition which does not contain any builders. The table also provides a gel volume percent value for each of the various builders.

TABLE II

| Builder No. | Test No. 1 | | | Test No. 2 | |
|---|---|---|---|---|---|
| | ($\Delta W$) | Gel Vol.% | pH | Gel Vol.% | pH |
| Control | 37.4 | — | — | — | — |
| 1 | 47.0 | 0 | 10.5 | 0 | 0.6 |
| 2 | 46.3 | 0 | 11 | 0 | 0.5 |
| 3 | 46.1 | 4.8 | 11 | 4.6 | 3.7 |
| 4 | 58.3 | 100.0 | 11 | 38.0 | 4.0 |
| 5 | 51.5 | 100.0 | 11 | 15.0 | 2.5 |
| 6 | 54.4 | 100.0 | 10.8 | 40.0 | 3.6 |
| 7 | 57.0 | 100.0 | 11.5 | 56.0 | 3.6 |
| 8 | 57.5 | 100.0 | 11.5 | 50.0 | 3.2 |
| 9 | 58.3 | 100.0 | 10.8 | 54.0 | 3.5 |

With respect to the ($\Delta W$) values, the above given data shows that the value for this factor which is obtained for the builder-free control was 37.4. Accordingly, any detergent composition whose ($\Delta W$) value was greater than 37.4 would be considered efficacious. In this respect, the data reveal that the use of a linear copolymer provides detergency results which are approximately equal to those attained with STPP whereas all of the crosslinked copolymers with a gel volume greater than 5, i.e., Nos. 4–9, displayed superior results as detergent builders. On the other hand, Builder No. 3, while crosslinked, had a gel volume percent of only 4.8 and was, therefore, no better than either STPP or the linear copolymer represented by Builder No. 2.

The data also reveal the existence of an inverse relationship between the ($\Delta W$) value of a detergent composition and the extent to which its polymeric detergent builder has been crosslinked. Thus, where a builder such as No. 4 has been crosslinked with only 0.8 percent of DETA, it has the rather high ($\Delta W$) value of 58.3. On the other hand, when the identical copolymer salt is excessively crosslinked with 20 percent of DETA, i.e., Builder No. 3, its ($\Delta W$) value is reduced to only 46.1. From the latter results, it is apparent that neither inadequate nor excessive crosslinking will yield products which provide ($\Delta W$) values superior to those attainable with STPP. Thus, superior washing action on the part of these crosslinked copolymers can only be obtained with an optimum degree of crosslinking as is found, for example, in Builder No. 4 which has been crosslinked only to the extent necessary to provide it with an insoluble but highly swellable gel structure upon being introduced into an aqueous alkaline medium.

EXAMPLE II

The superiority, as a detergent builder, of a water-insoluble, water swellable, gel forming copolymer fraction over a crosslinked but still water-soluble fraction of the identical copolymer is illustrated in this example.

As the starting material, there is used the commercially available, crosslinked ≈1:1, by mole, ethylene:maleic anhydride copolymer sold by the Monsanto Company as "EMA-91." Thus, 10 grams of "EMA-91" are introduced into 990 grams of preheated distilled water, and the resulting suspension is maintained at 55°–60° C. for 3 hours under vigorous stirring. The resulting viscous fluid is then centrifuged for 4 hours at about 2,500 rpm in four 200 ml cuvettes. At the end of the centrifugation, two distinct and separate phases are found in each cuvette, the lower phase being an essentially opaque, greyishwhite, water-insoluble gel of about 55 vol.-percent while the upper phase is a crystal clear liquid of about 45 vol.-percent. The clear upper phase is separated by means of a syringe whereupon the solids content of each phase is determined by evaporation in air followed by 16 hours of vacuum drying at 75° C. Accordingly, the amount of each fraction in the dry copolymer is as follows:

82.7 wt.% of the insoluble gel forming material, and
17.3 wt.% of the soluble fraction.

A portion of each fraction is then subjected to the above described standard washing test and is also compared to the commercially available non-crosslinked, linear≈1:1 ethylene:maleic anhydride copolymer "EMA-31" sold by the Monsanto Co. Table III, hereinbelow, presents the results of these washing tests, revealing that the soluble phase obtained by the fractionation of crosslinked copolymer shows practically no improvement, as a detergent builder, over the use of a non-crosslinked, linear copolymer, i.e., "EMA-31". On the other hand, the insoluble, water swellable three dimensional gel fraction displays a remarkably high degree of efficiency as a detergent builder.

TABLE III ($\Delta W$) Values

| Builder Conc. in Wash Water | STP | "EMA-31" (Linear Copolymer) | Unfractionated "EMA-91" (Crosslinked Copolymer) | Water-Soluble Fraction of "EMA-91" (crosslinked Copolymer) | Water-insoluble Gel Fraction of "EMA 91" crosslinked Copolymer) |
|---|---|---|---|---|---|
| 1 g/liter | 46.5 | 46.3 | 58.2 | — | 58.3 |
| ½ g/liter | 43.0 | — | 55.3 | 47.6 | 55.3 |

EXAMPLE III

This example illustrates the preparation of a ≈1:1, by mole, propylene:maleic anhydride copolymer suitable for use in preparing the novel detergent builders of this invention.

A mixture of 200 grams of maleic anhydride and 700 milliliters of acetone is charged into a 3-liter Parr bomb equipped with a gas inlet valve, a valve for the introduction of initiator solution and a thermocouple well. After degassing in a dry-ice acetone bath, a total of 20 grams of propylene is introduced into the Parr bomb. The Parr bomb is then heated to a temperature of about 84°-85° C. and 166 milliliters of a 4 percent, by weight, solution of benzoyl peroxide in acetone is then introduced by means of a metering pump over a period of 5 ½ hours. The reaction mixture is heated at this temperature for an additional 4 ½ hours and, after cooling to room temperature, the Parr bomb is vented and the reaction mixture precipitated, with agitation, into 8-liters of diethyl ether. After drying, the above described copolymer is obtained. It has a relative viscosity in excess of 1.05 as determined by means of the above described procedure.

EXAMPLE IV

This example illustrates the conversion of the propylene:maleic anhydride copolymer whose preparation was described in Example III, hereinabove, into the form of its sodium salt.

A total of 5 grams of the copolymer of Example III is treated with an excess of a 10 percent, by weight, aqueous sodium hydroxide solution. After complete dissolution is achieved, the polymer solution is precipitated in methanol. The resultant sodium salt of the copolymer is then filtered and is finally obtained in a quantitative yield. It is to be noted that the sodium hydroxide solution converts the maleic anhydride moieties of the copolymer to the acid form and thereupon neutralizes these acid moieites to the sodium salt form.

EXAMPLE V

This example illustrates the crosslinking and subsequent neutralization of the propylene:maleic anhydride copolymer whose preparation is described in Example III hereinabove.

To a solution of 5 grams of the copolymer of Example III in 50 g of N-methylpyrrolidone there is added 10 milliliters of a solution containing 1 gram of diethylenetriamine (DETA) diluted to 100 milliliters with N-methylpyrrolidone. This mixture is heated and stirred for 1 hour at a temperature of about 80°-90° C. yielding a viscous, opaque mixture. A drop of this mixture gives rise to swollen gel particles when introduced into a 10 percent, by weight, aqueous sodium hydroxide solution thus indicating insolubility on the part of the crosslinked copolymer. With vigorous agitation, an excess of the sodium hydroxide solution is then added to the balance of the crosslinked copolymer in order to convert it into the salt form. The entire mixture is then poured into methanol yielding a white precipitate which is separated by filtration and is then dried. The yield of the sodium salt of this water-insoluble, crosslinked, propylene:maleic anhydride copolymer is quantitative.

This product is found to have a gel volume above 5 percent and provides excellent results as a detergent builder on being formulated into the standard detergent composition described in Example I.

EXAMPLE VI

This example illustrates the preparation of another of the novel detergent builders of this invention.

Ten grams of "EMA-31", as previously described, is crosslinked by being dissolved in 25 milliliters of acetone and the resulting solution is warmed to a temperature of about 45°-55° C. To this warm solution there is then added 8 milliliters of a solution which is made by diluting about 1 gram of DETA to 100 milliliters with acetone. Gelation occurs in a period of about 1 minute. The acetone solvent is then partially removed by blowing a stream of nitrogen over the mixture and the remaining solvent is removed under vacuum. In this manner the copolymer is crosslinked with 0.8 percent, by weight of DETA.

This water-insoluble product is found to have a gel volume of 100 percent, as determined by Test No. 1, and provides excellent results as a detergent builder on being formulated into the standard detergent composition described in Example I.

EXAMPLE VII

This procedure illustrates the preparation of another of the novel detergent builders of this invention.

The procedure of Example VI was repeated with the exception, in this instance, that only 1.8 milliliters of the acetone solution of DETA is used for the crosslinking of the ethylene:maleic anhydride copolymer. This reaction provides a quantitative yield of the copolymer which has been crosslinked with 0.18 percent, by weight, of DETA. This water-insoluble product is found to have a gel volume in excess of 90 percent, as determined by means of Test No. 1 and provides excellent results as a detergent builder on being formulated into the standard detergent composition described in Example 1.

EXAMPLE VIII

This example illustrates the preparation of $\approx 1:1$, by mole, propylene:itaconic anhydride copolymer suitable for use in preparing the novel detergent builders of this invention.

In preparing this copolymer, the procedure of Example III is repeated with the exception, in this instance, that an equal amount, on a molar basis, of itaconic anhydride is substituted for the maleic anhydride. The resulting copolymer has a relative viscosity in excess of 1.05 as determined under the above described conditions.

EXAMPLE IX

This example illustrates the crosslinking and subsequent neutralization of the propylene:itaconic anhydride copolymer whose preparation is described in Example VIII hereinabove.

Thus, a quantitative yield of the crosslinked, sodium salt of the copolymer of Example VIII is obtained by subjecting this copolymer to the reaction procedure described in Example V. This water insoluble product is found to have a gel volume in excess of 60 percent, as determined by Test No. 1, and provides excellent results as a detergent builder on being formulated into the standard detergent composition described in Example I.

EXAMPLE X

This example illustrates the preparation of another copolymer suitable for use in preparing the novel detergent builders of this invention.

Thus, a $\approx 1:1$, by mole, ethylene:citraconic anhydride copolymer is prepared utilizing the polymerization procedures of Example III with the exception, in this instance, that ethylene is substituted for the propylene and citraconic anhydride is used in place of the maleic anhydride. The resulting copolymer has a relative viscosity in excess of 1.05 as determined under the above described conditions.

EXAMPLE XI

This example illustrates the crosslinking of the $\approx 1:1$, by mole, ethylene:citraconic anhydride copolymer of Example X.

Thus, the crosslinking procedure of Example VI is followed with the exception, in this instance, that the copolymer of Example X is substituted for the ethylene:maleic anhydride copolymer. By this means, a quantitative yield of the water-insoluble, crosslinked copolymer is obtained. It is found to have a gel volume of greater than 5 percent and provides excellent results as a builder on being formulated into the standard detergent composition described in Example I.

Variations may be made in proportions, procedures and materials without departing from the scope of this invention as defined in the following claims.

What is claimed is:

1. A detergent composition consisting essentially of a mixture of:
   a. From 1 to about 2 parts by weight of at least one surfactant selected from the group consisting of anionic, nonionic, zwitterionic and ampholytic surfactant and mixtures thereof; and as a builder for said detergent composition;
   b. From about 5 to about 1 part by weight of an alkali metal or ammonium salt of a crosslinked, water-insoluble copolymer of from about 20 to about 80 mole percent of at least one olefin having two to 3 carbon atoms, or mixtures thereof, and from about 80 to about 20 mole percent of at least one polycarboxyl vinyl monomer selected from the group consisting of maleic, fumaric, itaconic, aconitic, methylene malonic, mesaconic, 3-butene-1,2,3-tricarboxylic and citraconic acids, anhydrides, their alkali metal or ammonium salts or mixtures thereof; said crosslinked copolymer being water swellable and capable of forming a gel when introduced into an aqueous medium and having a relative viscosity, prior to crosslinking, of at least 1.05 as a 1 percent solution in N-methylpyrrolidone at 25° C, and wherein said copolymer is crosslinked with a crosslinking agent having the structure:

$$R\text{-}(x)_n$$

wherein R is an aliphatic or aromatic hydrocarbon having from about two to 30 carbon atoms; $x$ is selected from the group consisting of a primary and secondary hydroxyl, primary and secondary —SH and —NHR' groups, -N = C = O groups, epoxy groups and ethyleneimine groups, and wherein R' is selected from the group consisting of hydrogen, alkyl groups having from about one to 12 carbon atoms; and, wherein n is an integer having a value of from about 2 to 100, said crosslinking agent being employed in a weight ratio to said copolymer of from about 1:20 to about 1:500.

2. The detergent composition of claim 1, wherein said copolymer is crosslinked with a crosslinking agent selected from the group consisting of alkylene polyamines and alpha, omega-polymethylene diamines.

3. The detergent composition of claim 2, wherein said copolymer is crosslinked with diethylenetriamine.

4. The detergent composition of claim 1, wherein said crosslinked copolymer has a gel volume of at least about 5 percent as a 1 percent by weight concentration in distilled water at a pH of 11.

5. The detergent composition of claim 1, wherein said polycarboxyl vinyl comonomer is maleic anhydride.

6. The detergent composition of claim 1, wherein said olefin is ethylene.

7. The detergent composition of claim 1, wherein said olefin is propylene.

8. An aqueous dispersion of the detergent composition of claim 1.

9. The detergent composition of claim 1, wherein said crosslinked copolymer is selected from the group consisting of the copolymer of ethylene and maleic anhydride and the copolymer of propylene and maleic anhydride.

10. A detergent composition consisting essentially of a mixture of:
   a. From about 1 to about 2 parts by weight of at least one surfactant selected from the group of anionic, nonionic, zwitterionic and ampholytic surfactants and mixtures thereof; and, as a builder for said detergent composition;
   b. From about 5 to about 1 part by weight of a crosslinked, water insoluble copolymer of from about 20 to 80 mole percent of ethylene and from about 80 to 20 mole percent maleic anhydride; said crosslinked copolymer being water-swellable and capable of forming a gel when introduced into an aqueous medium, and having a relative viscosity, prior to crosslinking, of at least 1.05 as a 1 percent solution in N-methyl-pyrrolidone at 25° C, and wherein said copolymer is crosslinked with a crosslinking agent having the structure:

$$R\text{-}(x)_n$$

wherein R is an aliphatic or aromatic hydrocarbon having from about two to 30 carbon atoms; $x$ is selected from the group consisting of a primary and secondary hydroxyl, primary and secondary —SH and —NHR' groups, —N = C = O groups, epoxy groups and ethyleneimine groups, and wherein R' is selected from the group consisting of hydrogen, alkyl groups having from about one to 12 carbon atoms; and, wherein $n$ is an integer having a value of from about 2 to 100, said crosslinking agent being employed in a weight ratio to said copolymer of from about 1:20 to about 1:500.

11. The detergent composition of claim 10, wherein said copolymer is crosslinked with a crosslinking agent selected from the group consisting of alkylene polyamines and alpha, omega-polyethylene diamines.

12. The detergent composition of claim 11, wherein said copolymer is crosslinked with diethylenetriamine.

13. The detergent composition of claim 10, wherein said crosslinked copolymer has a gel volume of at least about 5 percent as a 1 percent by weight concentration in distilled water at a pH of 11.

14. The detergent composition of claim 10, wherein said crosslinked copolymer is in the form of an alkali metal or ammonium salt.

15. An aqueous dispersion of the detergent composition of claim 10.

16. A detergent composition consisting essentially of a mixture of:
   a. From about 1 to about 2 parts by weight of at least one surfactant selected from the group consisting of anionic, nonionic, zwitterionic and ampholytic surfactants and mixtures thereof; and, as a builder for said detergent composition;
   b. From about 5 to about 1 part by weight of a crosslinked, water-insoluble copolymer consisting of a copolymer of 20 to 80 mole percent ethylene and 80 to 20 mole percent maleic anhydride which has a relative viscosity, prior to crosslinking, of 1.05 as a 1 percent solution in N-methylpyrrolidone at 25° C., and which has been crosslinked with diethylenetriamine in a weight ratio of copolymer to crosslinking agent of about 20:1 to about 500:1; said copolymer being water-swellable and capable of forming a gel having a gel volume of at least 5 when introduced into distilled water in a 1 percent by weight concentration at a pH of about 11.

* * * * *